Aug. 6, 1935.     J. A. PERRY     2,010,769
BOLTED PIPE JOINT
Filed March 14, 1934
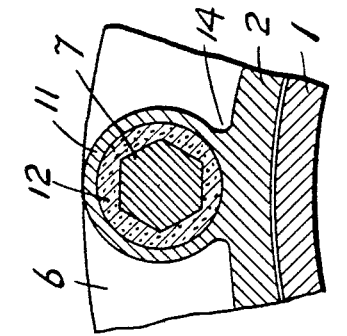
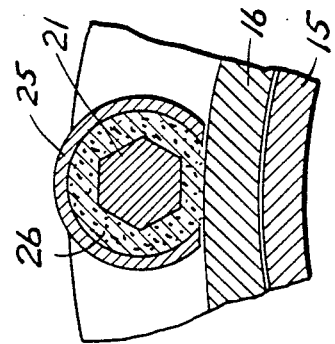
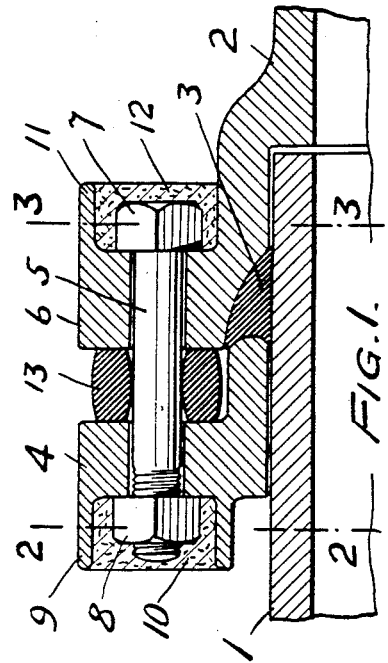
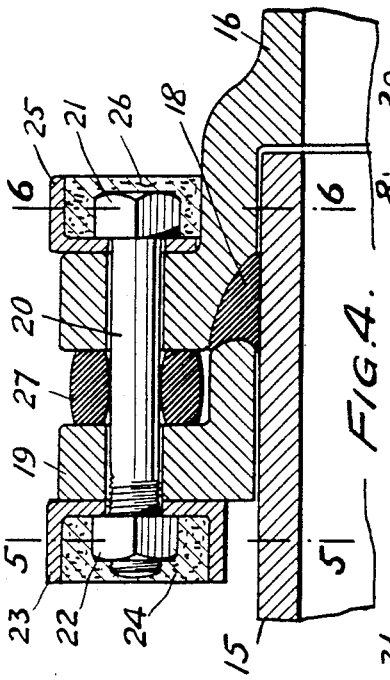
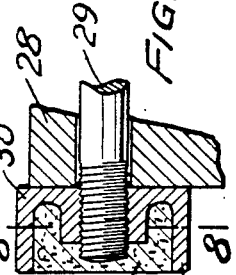
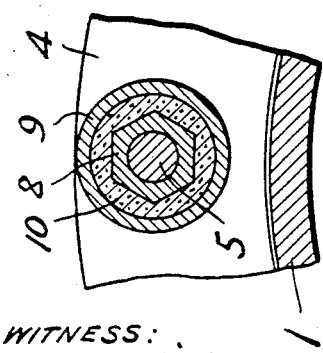
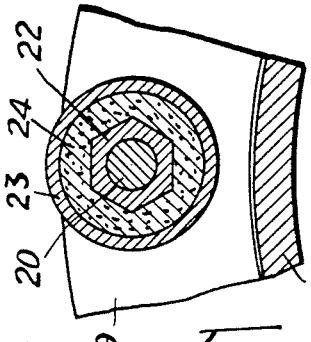
WITNESS:
Rob't R. Mitchell.
INVENTOR
Joseph A. Perry
BY
Augustus B. Stoughton
ATTORNEY.

Patented Aug. 6, 1935

2,010,769

UNITED STATES PATENT OFFICE 2,010,769

BOLTED PIPE JOINT

Joseph A. Perry, Swarthmore, Pa., assignor to The United Gas Improvement Company, Philadelphia, Pa., a corporation of Pennsylvania Application March 14, 1934, Serial No. 715,438

5 Claims. (Cl. 285—17)

The present invention relates to bolted pipe joints for underground metal piping.

It has been discovered from tests under my direction that, on typical bolted metal pipe joints subject to electrolytic corrosion, there is a great tendency for the bolts and nuts of the joints to lose a disproportionate quantity of metal as compared with the remainder of the joint. Due to their position and surface exposure, the disproportionate quantity of electricity tends to leave the joint from the exposed portions of the bolts and nuts. As a result, joints fail by corrosion of the bolts and nuts, while the remainder of the joint, which can better afford the loss of metal, is still in relatively good condition.

The principal object of the present invention is to provide means for preventing or minimizing the loss of metal from the ends of the bolts and nuts, and thereby prolonging the life of the joints.

The invention will be described in connection with the attached drawing, which forms a part of this specification and which shows modifications of the invention chosen for illustration, and in which:

Fig. 1 shows, chiefly in cross-section, a portion of a bolted bell and spigot joint embodying a form of the invention;

Fig. 2 shows a cross-section along the line 2—2 in Fig. 1;

Fig. 3 shows a cross-section along the line 3—3 in Fig. 1;

Fig. 4 shows a modification of the apparatus of Fig. 1;

Fig. 5 shows a cross-section along the line 5—5 in Fig. 4;

Fig. 6 shows a cross-section along the line 6—6 in Fig. 4;

Fig. 7 shows a modification of the washer and nut of Fig. 4; and

Fig. 8 shows a cross-section along the line 8—8 in Fig. 7.

Referring to Figs. 1 and 2, I generally indicates a portion of the spigot end of a pipe section, and 2 is a portion of the bell end of an adjoining section. 3 indicates the rubber packing ring which is driven into the joint by the follower ring 4, when the bolts are drawn up. 5 indicates one of the bolts, which passes through the flange of the follower ring and engages the back of the bell flange 6 by the head 7. 8 is the nut. 9 indicates a raised cup, cast onto the face of the follower ring, encircling the end of the bolt and nut, and adapted to be filled with plastic, electrically insulating material 10 such as, for instance, pitch or cement, to protect the end of the bolt and nut.

It will be understood that the follower ring is drawn up by a plurality of bolts only one of which is illustrated.

In the joint illustrated in Figs. 1 and 2, the back of the bell flange is also provided with raised cups, cast on the face of the flange and encircling the bolt heads. One of these cups is illustrated at 11, and, as shown, is adapted to be filled with the plastic, insulating material 12.

In the joint illustrated, the bolt between flanges of the follower ring and bell is protected by the flexible rubber ring 13, which does not form a part of this invention.

It will be noted that the cup 9 is carried by the follower ring and cup 11 entirely by the bell, so that relative movement of the pipe sections will not tend to disrupt the protective material in the cups.

The cup on the bell may be formed as shown by running into the bell as indicated in Fig 3 at 14, or separate from the bell if the bell flange is wide enough.

Referring to Figs. 4, 5 and 6, these figures show a modification of the apparatus of Figs. 1, 2 and 3. 15 is the spigot, 16 the bell, 18 the rubber packing ring, 19 the follower ring, and 20 one of the bolts of the joint, provided with the head 21 and the nut 22. Instead of forming the protective cup on the face of the follower ring flange, a flanged washer 23 is provided, which is held against the follower ring by the nut, and which is adapted to retain the insulating material 24. In similar manner, instead of forming a cup on the back of the bell flange, the flanged washer 25 is provided, which is adapted to retain the insulating material 26. As shown, the washer flange is not complete, a portion of the wall of the bell forming part of the pocket for the insulating material. If the bell flange is sufficiently wide, the washer 25 may be made identical to washer 23.

27 indicates a flexible rubber ring to protect the bolt between flanges.

The washers are in some ways preferable to the formed pockets of Figs. 1, 2 and 3, and they may be employed with a wide variety of present joints without change in the molds. These washers may be economically made and readily installed. The cup, shown in Figs. 1 and 2 on the follower ring, may be formed inexpensively, while the cup shown in Figs. 1 and 3 on the bell flange is possibly more expensive to form, and the washer for the bell flange shown in Figs. 4 and 6 may be preferable for that reason. Referring to Figs. 7 and 8, these figures show a modification of the apparatus of the preceding figures, in which the nut and protective washer are combined.

28 indicates a portion of a follower ring flange, and 29 indicates a bolt. 30 indicates a nut, which has a spaced, outer flange 31 forming a pocket adapted to be filled with insulating material 32, which protects the threaded portion of the nut and the end of the bolt.

In some present joints, the head of the bolt is encased or protected in some manner; in such case, the cup of the present invention need be applied only to the follower ring to protect the end of the bolt and nut.

The invention is applicable to a wide variety of types of joints as well as to leak clamps, although, for the most complete protection, the cups should be filled with insulating material, covering the ends of the bolts and nuts. Even if the cups are not so filled, some protection is secured, as the current tends to leave from the walls of the cups, instead of from the bolt ends and nuts.

I do not intend to be limited save as the scope of the prior art and of the attached claims may require.

I claim:—

1. A pipe joint having the joint between adjacent pipes closed by a washer and a follower ring compressing said washer and attached to one of said pipes by bolts having nuts thereon and detachable cups clamped by said nuts against said follower ring, said cups having flanges encircling one of the ends of said bolts and the nuts thereon.

2. In the combination according to claim 1, insulating material in said cups surrounding one of the ends of said bolts and the nuts thereon.

3. A pipe joint having the joint between adjacent pipes closed by a washer and a follower ring compressing said washer and attached to one of said pipes by bolts, and flanged washers providing cups carried by said bolts, the flanges of said washers outstanding about the ends of said bolts and surrounding them.

4. Means for restricting the electrolytic corrosion loss of metal from the bolts and nuts of pipe joints provided with spaced flanges and with bolts and nuts connecting said flanges, comprising the combination with said flanges and nuts and bolts, of, means providing individual flanges defining open ended cavities and outstanding about the ends of said bolts.

5. Means for restricting the electrolytic corrosion loss of metal from the bolts and nuts of pipe joints provided with spaced flanges and with bolts and nuts connecting said flanges, comprising the combination with said flanges and nuts and bolts of individual flanges defining open ended cavities and outstanding about the ends of said bolts, and insulating material arranged in the cavities.

JOSEPH A. PERRY.